(12) United States Patent
Willis et al.

(10) Patent No.: US 6,324,828 B1
(45) Date of Patent: Dec. 4, 2001

(54) GAS TURBINE ENGINE AND A METHOD OF CONTROLLING A GAS TURBINE ENGINE

(75) Inventors: Jeffrey D. Willis, Ernsford Grange; James Melville, Littleover; Paul Fletcher, Rugby; Phillip P. Walsh, Solihull, all of (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/573,562

(22) Filed: May 19, 2000

(30) Foreign Application Priority Data

May 22, 1999 (GB) .................................................. 9911871

(51) Int. Cl.⁷ ....................................................... F02C 9/20
(52) U.S. Cl. ...................... 60/39.03; 60/39.23; 60/39.25; 60/39.29
(58) Field of Search ................................ 60/39.03, 39.23, 60/39.29, 39.25

(56) References Cited

U.S. PATENT DOCUMENTS

| | | | |
|---|---|---|---|
| 4,539,810 | * 9/1985 | Watanabe | 60/39.161 |
| 5,224,337 | * 7/1993 | Morishita | 60/39.03 |
| 5,584,171 | * 12/1996 | Sato | 60/39.03 |
| 5,613,357 | * 3/1997 | Mowill | 60/39.23 |
| 6,253,538 | * 7/2001 | Sampath | 60/39.06 |

* cited by examiner

Primary Examiner—Louis J. Casaregola
Assistant Examiner—Ehud Gartenberg
(74) Attorney, Agent, or Firm—W. Warren Taltavull; Manelli, Denison & Selter PLLC

(57) ABSTRACT

A gas turbine engine comprises a centrifugal compressor (4), an air diffuser (8), a heat exchanger (10), combustion apparatus (12), and first and second turbines (14,18). The combustion chamber assembly (22) comprises a primary, a secondary and a tertiary fuel and air mixing ducts (54,78, 98). The compressor (4), diffuser (8), primary and secondary fuel and air mixing ducts (54,78) and turbines (14,18) all comprise means (6,8,16,20) for varying the mass flow area at their inlets such that in operation the amount of air mass through each component may be independently variable. Under part power conditions the mass flow is reduced and under full power conditions the mass flow is increased thereby maintaining a substantially constant gas cycle throughout the engine.

31 Claims, 13 Drawing Sheets

Fig.11.

GAS TURBINE ENGINE AND A METHOD OF CONTROLLING A GAS TURBINE ENGINE

This invention relates to gas turbine engines and in particular relates to gas turbine engines for non-aero applications.

One main consideration for the operation of gas turbine engines is the specific fuel consumption value (SFC), measured in Kg/kWhrs. In general for certain gas turbine engine applications especially marine, automotive and even industrial, a significant proportion of operation is at low power. A gas turbine engine utilizes hot working fluid expanding through a given expansion ratio in the turbines which produces a power in excess of that required for the compressor to produce the corresponding pressure ratio. This is due to pressure and temperature ratios being proportional to one another during compression or expansion in the simple gas turbine engine cycle, which means that temperature change, and hence work, is proportional to the initial temperature level. Therefore reducing the amount of fuel available at part power results in reduced temperature levels and hence a reduced speed and pressure ratio thus resulting in a significant increase in specific fuel consumption (SFC).

Recuperated gas turbine engines use heat exchangers to return heat from the final turbine exhaust to pre-heat compressed air entering the combustor. This helps to conserve fuel by raising the combustor air temperature and therefore limiting the amount of fuel needed to achieve the turbine inlet temperature.

It is also known to provide a power turbine with variable area nozzles (VANs) to improve SFC at part power conditions. Such an arrangement of VANs is disclosed in GB2301868 and GB application No 9511269.4.

It is also known to provide a gas turbine compressor arrangement where the compressor vane angles are varied so as to alter the flow area. One such arrangement of variable compressor guide vanes is disclosed in GB2210108. Other arrangements for varying the mass flow through a gas turbine engine are disclosed in U.S. Pat. Nos. 3,138,923 and 3,025,688 and 4,145,875. These prior art patents disclose variable geometry arrangements in the form of angled vanes positioned to change the incident angle of gas flow with respect to either diffuser passages or nozzle passages.

As mentioned previously when the gas turbine engine is operated at low power the reduced levels of pressure ratio and temperature result in increased fuel consumption. It is desirable therefore that the gas turbine engine cycle is optimised at low power so that fuel consumption is reduced. In the prior art, for recuperated gas turbine engine cycles the variable area nozzle is closed as power is reduced maintaining the desired high temperature levels in the recuperator.

A small gas turbine engine is described in UK patent application no. 9800782.6 filed Jan. 15, 1998 and in a corresponding International patent application no PCT/GB99/00074 Jan. 8, 1999. This gas turbine engine comprises a centrifugal compressor, a diffuser, a heat exchanger, combustion apparatus, and at least one turbine. The compressor has variable inlet guide vanes, the diffuser has variable outlet guide vanes and the at least one turbine has variable inlet guide vanes so that the flow capacity of each component is independently variable while maintaining the temperature, pressure ratio and speed of rotation of the gas turbine engine substantially constant.

A combustion chamber is required for this gas turbine engine which produces low emissions of the oxides of nitrogen (NOx), carbon monoxide (CO) and unburned hydrocarbons (UHC) throughout the entire power range of the gas turbine engine, but especially at low powers.

The fundamental way to reduce the emissions of nitrogen oxides (NOx) is to reduce the combustion reaction temperature, and this requires premixing of the fuel and most of the combustion air before combustion occurs. The oxides of nitrogen (NOx) are commonly reduced by a method which uses two stages of fuel injection. Our UK patent no GB1489339 discloses two stages of fuel injection. Our International patent application no. WO92/07221 discloses two and three stages of fuel injection. In staged combustion, all the stages of combustion seek to provide lean combustion and hence the low combustion temperatures required to minimise NOx. The term lean combustion means combustion of fuel in air where the fuel to air ratio is low, i.e. less than the stoichiometric ratio. In order to achieve the required low emissions of NOx and CO it is essential to mix the fuel and air uniformly.

The industrial gas turbine engine disclosed in our International patent application no. WO92/07221 uses a plurality of tubular combustion chambers, whose axes are arranged in generally radial directions. The inlets of the tubular combustion chambers are at their radially outer ends, and transition ducts connect the outlets of the tubular combustion chambers with a row of nozzle guide vanes to discharge the hot gases axially into the turbine sections of the gas turbine engine. Each of the tubular combustion chambers has two coaxial radial flow swirlers which supply a mixture of fuel and air into a primary combustion zone. An annular secondary fuel and air mixing duct surrounds the primary combustion zone and supplies a mixture of fuel and air into a secondary combustion zone. An annular tertiary fuel and air mixing duct surrounds the secondary combustion zone and supplies a mixture of fuel and air into a tertiary combustion zone.

It is an object of this invention to provide a gas turbine engine with improved fuel consumption over various power conditions and low emissions at low power levels.

According to the present invention there is provided a gas turbine engine comprising a centrifugal compressor, a diffuser, a heat exchanger, combustion apparatus and at least one turbine, wherein said centrifugal compressor, said diffuser, said combustion apparatus and said at least one turbine comprising means for varying the flow capacity at their inlets such that in operation the flow capacity of each component is independently variable so that over a predetermined power range the gas turbine engine mass flow is variable whilst maintaining the temperature, pressure ratio and speed of rotation of the gas turbine engine substantially constant.

Preferably the combustion apparatus comprises a primary combustion zone and a secondary combustion zone, the primary combustion zone being provided with a primary fuel and air mixing duct, the secondary combustion zone being provided with a secondary fuel and air mixing duct, said primary fuel and air mixing duct and said secondary fuel and air mixing duct comprising means for varying the flow capacity at their inlets.

Preferably the combustion apparatus comprises a primary combustion zone, a secondary combustion zone and a tertiary combustion zone, the primary combustion zone being provided with a primary fuel and air mixing duct, the secondary combustion zone being provided with a secondary fuel and air mixing duct, the tertiary combustion zone being provided with a tertiary fuel and air mixing duct, said primary fuel and air mixing duct and said secondary fuel and air mixing duct comprising means for varying the flow capacity at their inlets.

Preferably a first turbine is drivingly connected to the centrifugal compressor and a second turbine is drivingly connected to a load.

Preferably the second turbine is connected to the load via a gear unit.

Alternatively a first turbine is drivingly connected to the centrifugal compressor and is drivingly connected to an electrical generator.

Preferably the electrical generator is electrically connected to at least one electrical motor or an electric grid.

Preferably the electrical motor is drivingly connected to a load.

Preferably the load comprises a propeller of a marine vessel or a driving wheel of an automotive vehicle.

Preferably the means for varying the flow capacity of the compressor comprises variable inlet guide vanes.

Preferably the means for varying the flow capacity of the diffuser comprises moveable diffuser vanes pivotable such that their leading edges move in a tangential direction with respect to the axis of the diffuser.

Preferably the variable diffuser vanes are adapted to be moveable in unison with the variable inlet guide vanes.

Preferably the means for varying the flow capacity of the at least one turbine comprises variable area nozzles positioned within the inlet to the at least one turbine.

Preferably the at least one turbine is arranged to have a choked operation over the predetermined power range to ensure the flow capacity remains proportional to the area of the variable area nozzles.

Preferably the heat exchanger is annular. Preferably the gas turbine engine is arranged substantially within the annular heat exchanger such that the heat exchanger forms a containment structure around the gas turbine engine.

Preferably an exhaust duct carries hot exhaust gases discharged from the at least one turbine from the heat exchanger.

A second heat exchanger may be arranged in the exhaust duct, the second heat exchanger is arranged to heat another fluid to cool the exhaust gases. Preferably the second heat exchanger is arranged to heat air flowing through a duct to an air conditioning system. Preferably the second heat exchanger is arranged to heat water flowing through a duct, or in a boiler. Alternatively the second heat exchanger is arranged to heat fuel flowing through a duct to the combustion chamber of the gas turbine engine.

A further turbine may be arranged in the exhaust duct to cool the exhaust gases, the further turbine is arranged to drive a generator to charge a battery or supply an electrical load.

An ejector may be arranged in the exhaust duct to entrain air into the exhaust duct to cool the exhaust gases.

A fan may be arranged at the downstream end of the exhaust duct to mix air with the exhaust gases to cool the exhaust gases. Preferably the fan is driven by an electric motor.

Preferably the centrifugal compressor and first turbine are rotatably mounted by magnetic bearings, the magnetic bearings being arranged remote from the first turbine and combustion chamber. Preferably the second turbine is rotatably mounted by magnetic bearings remote from the first turbine, second turbine and combustion chamber.

The present invention also provides a method of controlling a gas turbine engine wherein the engine includes a centrifugal compressor, diffuser means, a heat exchanger, combustion apparatus and at least one turbine, comprising the steps of independently varying the flow capacity of the centrifugal compressor, the diffuser, the combustion apparatus and the at least on turbine such that the mass flow through each component is proportional to the power requirements of the gas turbine engine.

Preferably the combustion apparatus comprises a primary combustion stage, a secondary combustion stage and a tertiary combustion stage, the primary combustion stage being provided with a primary fuel and air mixing duct, the secondary combustion stage being provided with a secondary fuel and air mixing duct, the tertiary combustion stage being provided with a tertiary fuel and air mixing duct, the method comprising independently varying the flow capacity of the centrifugal compressor, the diffuser, the primary fuel and air mixing duct, the secondary fuel and air mixing duct and the at least one turbine such that the mass flow through each component is proportional to the power requirements of the gas turbine engine.

The present invention also provides a method of Controlling a gas turbine engine wherein the engine includes a centrifugal compressor, a diffuser, a heat exchanger, combustion apparatus and at least one turbine, said compressor, said diffuser, said combustion apparatus and said at least one turbine all comprise means for varying the flow capacity at their inlets, comprising the steps of independently varying the flow capacity of each component so that over a predetermined power range the gas turbine engine mass flow is variable whilst maintaining the temperature, pressure ratio and speed of rotation of the gas turbine engine substantially constant.

Preferably the combustion apparatus comprises a primary combustion stage, a secondary combustion stage and a tertiary combustion stage, the primary combustion stage being provided with a primary fuel and air mixing duct, the secondary combustion stage being provided with a secondary fuel and air mixing duct, the tertiary combustion stage being provided with a tertiary fuel and air mixing duct, said centrifugal compressor, said diffuser, said primary fuel and air mixing duct, said secondary fuel and air mixing duct and said at least one turbine all comprise means for varying the flow capacity at their inlets, comprising the steps of independently varying the flow capacity of each component so that over a predetermined power range the gas turbine engine mass flow is variable whilst maintaining the temperature, pressure ratio and speed of rotation of the gas turbine engine substantially constant.

The present invention will be more fully described by way of example with reference to the accompanying drawings in which:

FIG. 11 shows an alternative gas turbine engine according to the present invention.

Figure 3:
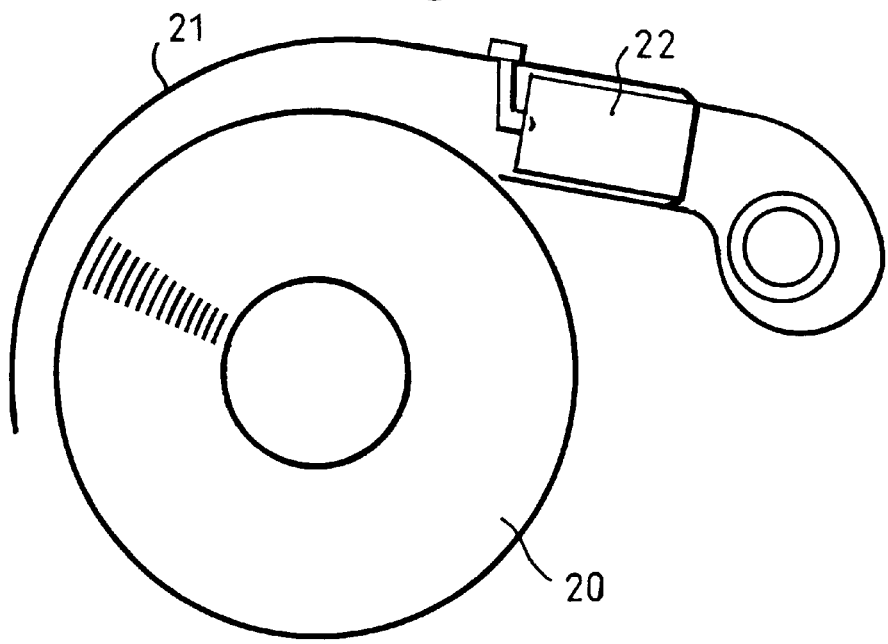
FIG. 3 is an enlarged cross-sectional view in the direction of arrows B—B in FIG. 1.
Figure 4:
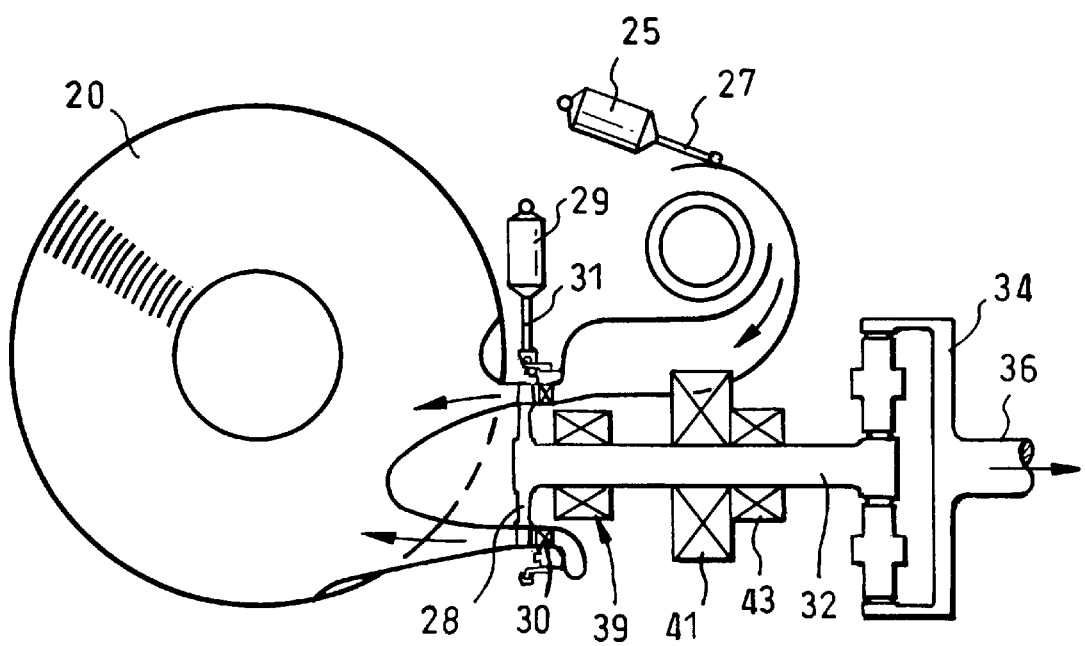
FIG. 4 is an enlarged cross-sectional view in the direction of arrows C—C in FIG. 1.

A gas turbine engine 10 according to the present invention is particularly suitable for marine and automotive applications which operate largely at low power. For example an automotive gas turbine engine may utilise 6% of the available power at speeds of approximately 30 mph, 180 of the available power at speeds of approximately 56 mph, 35% of the available power at speeds of approximately 75 mph for a vehicle with a maximum speed of 115 mph, as shown in FIG. 3.

The gas turbine engine 10 shown in FIG. 1 to 5 is a preferred arrangement for a gas turbine engine according to the present invention. The gas turbine engine 10 comprises a first centrifugal air compressor 12 comprising a radial inlet duct 14 incorporating variable inlet guide vanes 16 and a centrifugal impeller 12. The centrifugal compressor 12 delivers air via a variable area radial diffuser 18 to a heat exchanger 20. The variable area radial diffuser 18 reduces the velocity of the air before it enters the heat exchanger 20.

The variable area inlet guide vanes 16 comprise an aerofoil cross section. These inlet guide vanes are fully open when full power is required thus allowing the air to reach the impeller without substantial swirl and even a small amount of anti-rotative swirl to ensure the maximum amount of flow is passed. When the power demand is reduced the variable area inlet guide vanes 16 are positioned in a semi-closed state. This causes rotative swirl of the working fluid reaching the impeller inlet, which reduces the relative velocity, because the rotative swirl velocity is effectively subtracted from the rotational speed vector. Thus the mass flow of the working fluid at any given speed is reduced. The centrifugal impeller produces an increase in static pressure and absolute velocity. The working fluid leaves the impeller at speeds up to approximately Mach 1.

The working fluid passes into a variable area radial diffuser 18 which contributes to the compressor pressure rise by recovering velocity as static pressure. The diffuser vanes are pivoted so as to move in a tangential direction with respect to the diffuser and adjust the throat area. As these vanes are closed simultaneously with the variable inlet guide vanes, the leading edge incidence is optimised. In addition the degree of diffusion up to the throat is controlled. Too high an incidence or attempted diffusion would also result in surge. Surge is where the adverse flow conditions cause a high local pressure loss resulting in flow reversal as the pressure rise cannot be sustained.

This working fluid is then passed through the heat exchanger 20, then into the combustion chamber 22 and then to a first turbine 24. The working fluid is preheated in the heat exchanger 20. Fuel is burned in the combustion chamber 22 and the resulting combustion products flow into the first turbine 24 which is drivingly connected to the centrifugal compressor 12 via a shaft 23.

The first turbine 24 incorporates a variable area nozzle 26 which is operated so as to close the vanes as power demand falls thus reducing flow capacity. The turbine design expansion ratio is chosen high enough to ensure choked operation over most of the power range, thus ensuring flow capacity remains proportional to nozzle throat area. If unchoked, the flow capacity would be set by the expansion ratio and rotor throat area, and sufficient variation could not be achieved via the nozzle area.

The exhaust gases from this first turbine 24 are then directed into a free power turbine 28. The power turbine 28 also comprise variable area nozzles 30. The power turbine 28 is connected to a power shaft 32 which is in turn connected through a gear unit 34 to an output shaft 36 coupled to any suitable load device (not shown), for example, the driving wheels 38 of a motor vehicle or a propeller of a marine vessel or an electric generator. The hot exhaust gases from the power turbine 28 are directed back into the heat exchanger 20 to directly pre-heat the air from the diffuser 18 before it enters the combustion chamber 22.

An inlet filter 13 is provided at the inlet to the radial inlet duct 14 to remove dust and debris from the air entering the gas turbine engine 10. One or more ducts 9 are provided to carry the air from the radial flow diffuser 18 to the heat exchanger 20. One or more ducts 11 are provided to carry the preheated air from the heat exchanger 20 to the combustion chamber 22. One or more exhaust ducts 45 carry the hot exhaust gases from the heat exchanger 20 to atmosphere.

An actuator 15 comprising a hydraulically, pneumatically or electrically driven piston, or ram, 17 is provided to vary the position of the variable area inlet guide vanes 16. An actuator 19 comprising a hydraulically, pneumatically or electrically driven piston, or ram, 21 is provided to vary the position of the vanes of the variable area radial diffuser 18. An actuator 25 comprising a hydraulically, pneumatically or electrically driven piston, or ram, 27 is provided to vary the position of the vanes of the variable area nozzle 26. An actuator 29 comprising a hydraulically, pneumatically or electrically driven piston, or ram, 31 is provided to vary the position of the vanes of the variable area nozzle 30.

The shaft 23 is mounted in one or more magnetic bearings 33, 35 and 37, preferably the bearings are active magnetic bearings and the more preferably the bearings are superconducting magnetic bearings, however other suitable bearings may be used. The magnetic bearings 33 and 35 are positioned upstream of the centrifugal compressor 12, remote from the gas turbine engine 10, so that they are cool and are not affected by heat from the gas turbine engine 10.

The shaft 32 is mounted in one or more magnetic bearings 39, 41 and 43, preferably the bearings are active magnetic bearings and more preferably the bearings may be superconducting magnetic bearings, however other suitable bearings may be used. The magnetic bearings 39, 41 and 43 are positioned downstream of the first turbine 28, remote from the gas turbine engine 10, so that they are cool and are not affected by heat from the gas turbine engine 10.

The heat exchanger 20 preferably comprises a heat exchanger as described in our published European patent application no. 0753712A2, which is hereby incorporated by reference. The duct 19 supplies the air to the radially outer ends of a first set of radial passages through the heat exchanger 20 so that the air flows axially through an axially extending passage to a second set of radial passages through the heat exchanger 20 and then to the duct 21.

Figure 5:
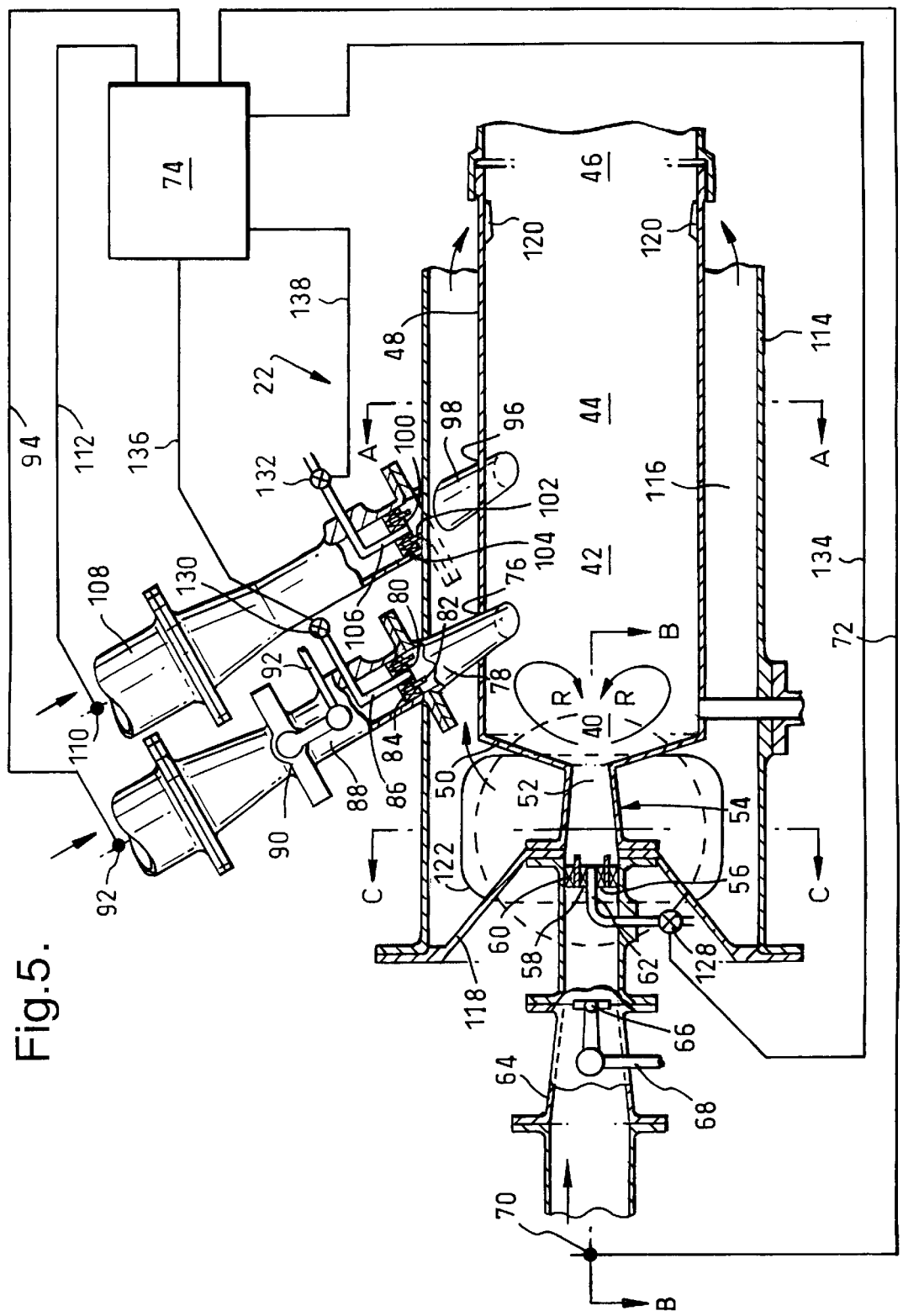
FIG. 5 is an enlarged longitudinal cross-sectional view through the combustion chamber assembly shown in FIG. 1.
Figure 6:
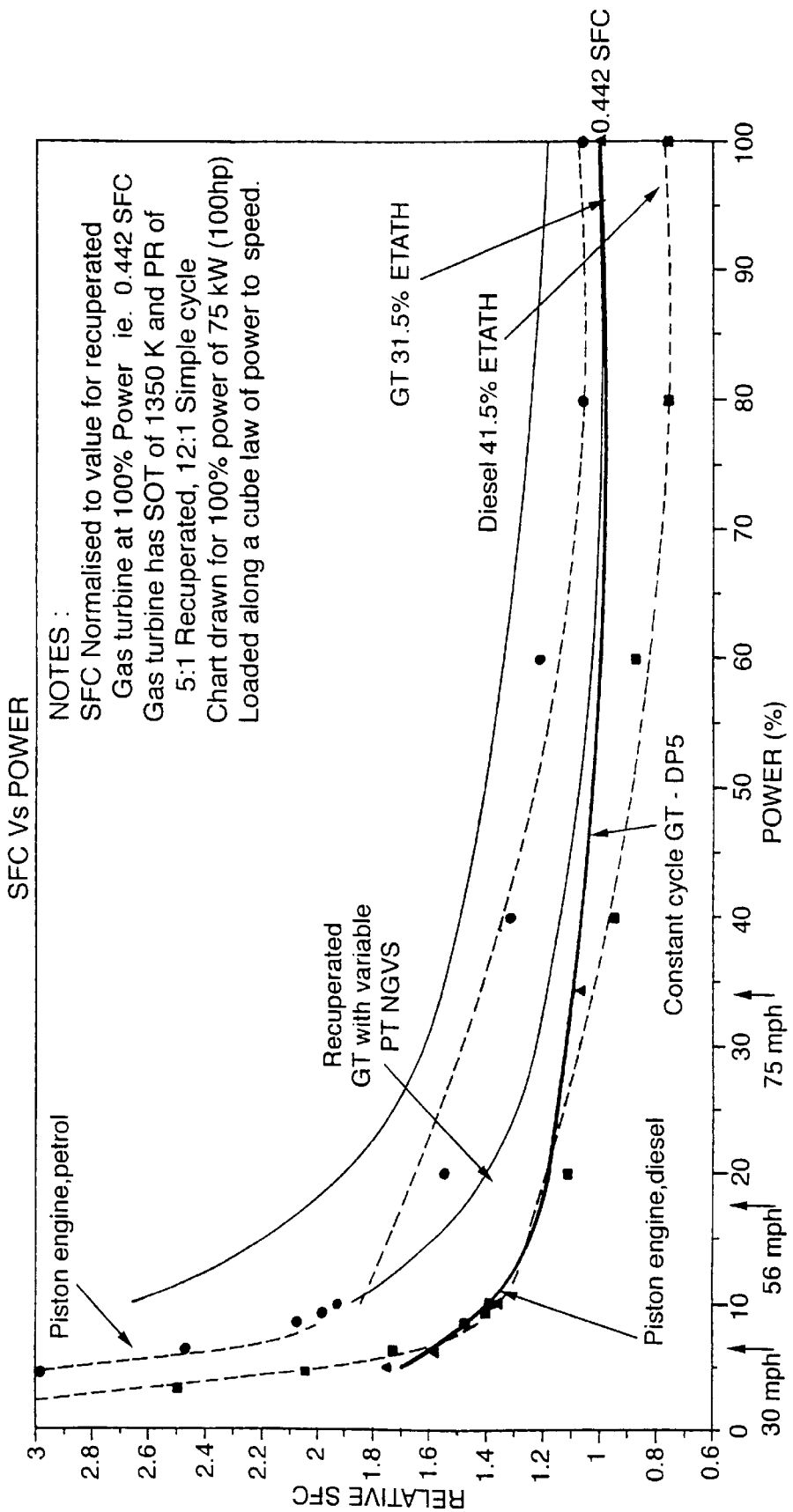
FIG. 6 is a graph comparing specific fuel consumption against power for a diesel engine and a gas turbine engine according to the present invention.
Figure 7:
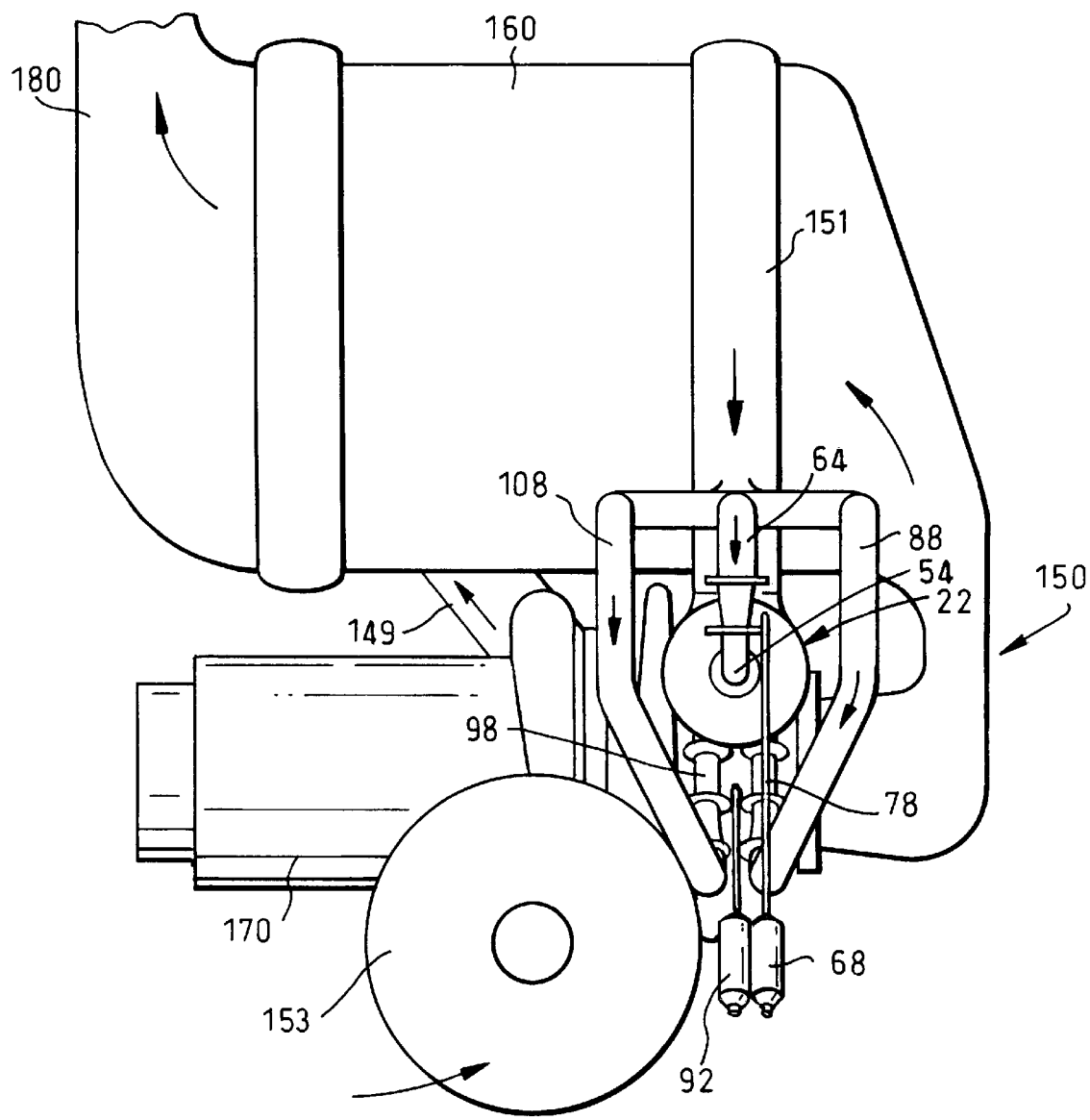
FIG. 7 shows a plan view of an alternative gas turbine engine according to the present invention.
Figure 8:
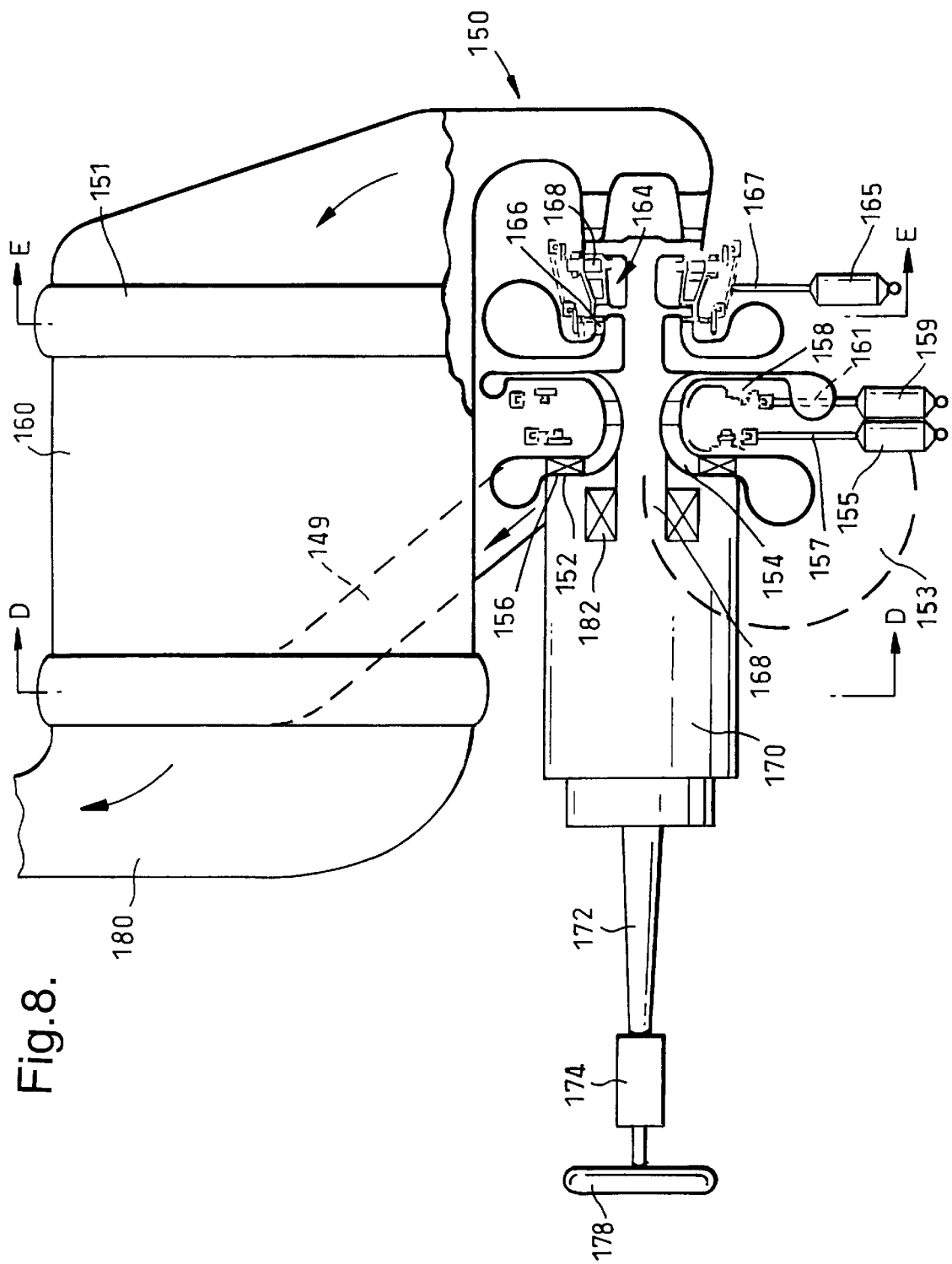
FIG. 8 is a cross-sectional view through the gas turbine engine shown in FIG. 7.
Figure 9:
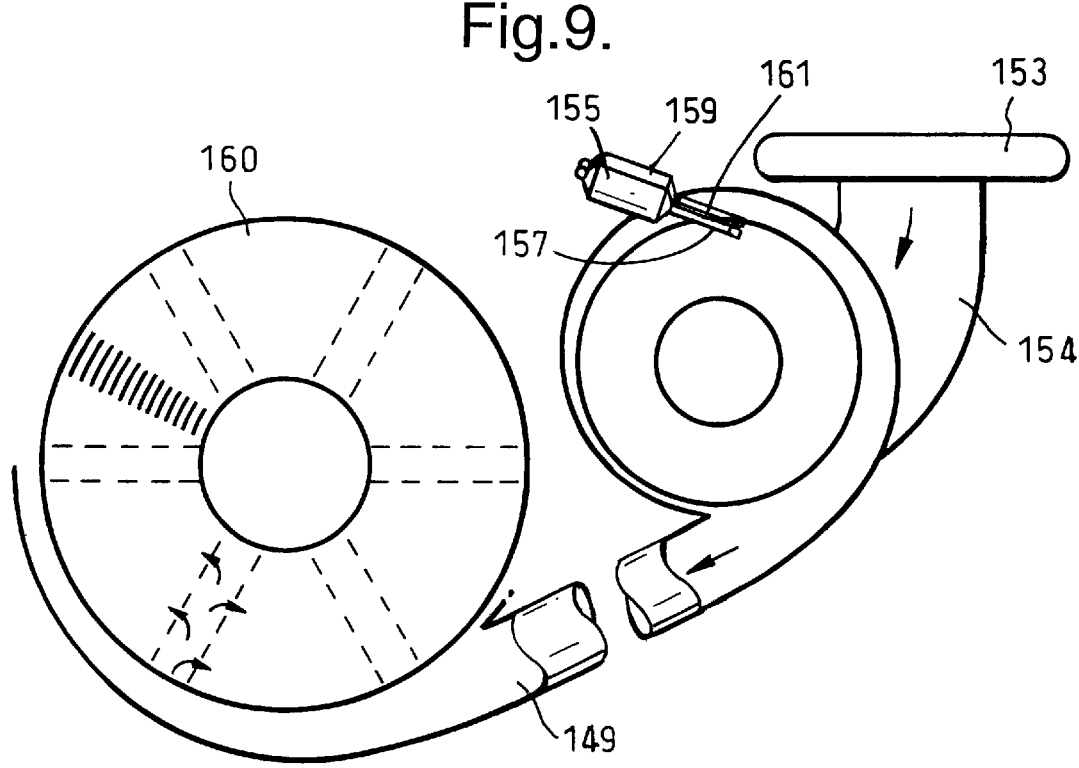
FIG. 9 is an enlarged cross-sectional view in the direction of arrows D—D in FIG. 8.
Figure 10:
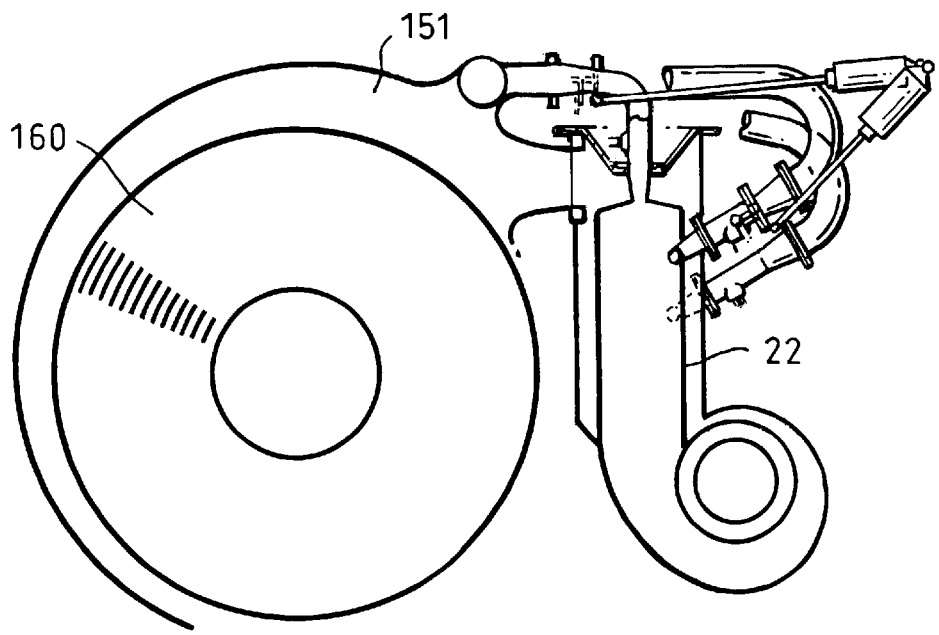
FIG. 10 is an enlarged cross-sectional view in the direction of arrows E—E in FIG. 8

The combustion chamber 22, as shown more clearly in FIG. 5, is a staged combustor incorporating a primary combustion zone 40, a secondary combustion zone 42 and a tertiary combustion zone 44 arranged in flow series and a dilution section 46 downstream of the tertiary combustion zone 44. All three combustion zones 40, 42 and 44 are provided with premixed fuel and air, the downstream, tertiary, combustion zone 44 including opposite swirl to that of the intermediate, secondary, combustion zone 42 to increase mixing and minimise swirl upstream of the dilution section 46.

It has been found that the overall level of pressure loss in a fixed geometry combustion chamber would change excessively due to changes in mass flow levels when the variable inlet guide vanes 16, variable area radial diffuser 18 and variable area nozzles 26 and 30 change their mass flow levels. Therefore the combustion chamber 22 is provided with features to vary the mass flow.

The combustion chamber 22 is a tubular combustion chamber and comprises an inner cylindrical wall 48 which defines the primary, secondary and tertiary combustion zones 40, 42 and 44 and the dilution section 46. The upstream end of the cylindrical wall 48 has a conical head 50 which is provided with an aperture 52 coaxially with the axis of the cylindrical wall 48.

A primary fuel and air mixing duct 54 is arranged to supply a mixture of fuel and air into the primary combustion zone 40 through the aperture 52 in the head 50 of the combustion chamber 22. The primary fuel and air mixing duct 54 is arranged coaxially with the axis of the cylindrical wall 46 of the combustion chamber 22 but may be arranged tangentially. The primary fuel and air mixing duct 54 comprises a first, radially inner, axial flow swirler 56, an annular member 58 surrounding and extending downstream from the first axial flow swirler 56 and a second, radially outer, axial flow swirler 60 surrounding the annular member 58. One of the axial flow swirlers 56, 60 is arranged to provide more swirl than the other of the axial flow swirlers 60, 56 such that there is residual swirl at the entry into the primary combustion zone 40 of the combustion chamber 22. The residual swirl enhances the primary flow reversal R to sustain the combustion process. A primary fuel injector nozzle 62 is arranged coaxially within the first axial flow swirler 56, to supply fuel into the primary fuel and air mixing duct 54. The primary fuel injector 62 is a simplex fuel injector and is arranged to spray fuel onto the annular member 58, and the fuel is atomised and mixed with the air by the oppositely swirling flows of air from the axial flow swirlers 56 and 60. The primary combustion zone 40 is arranged long enough to reduce carbon monoxide emissions and/or the external convection cooling reduces the quenching effect. Any carbon monoxide generated in the primary combustion zone 40 is consumed in the secondary combustion zone 42.

A first air duct 64 supplies heated air from the heat exchanger 20 to the primary fuel and air mixing duct 54. The first air duct 64 comprises a first valve 66 which is adjustable to vary the amount of air supplied to the primary fuel and air mixing duct 54. The first valve 66 is adjusted by an actuator 68. The first valve 66 is a two position butterfly valve, but it may be any other suitable two position valve or a multi position valve. The first air duct 64 also comprises an air flow measuring device 70, for example a low loss Corioli meter, a venturi meter or other low pressure loss velocity measuring device to accurately measure the air flow to the primary fuel and air mixing duct 54. The flow measuring device 70 sends a signal corresponding to the amount of air flowing to the primary fuel and air mixing duct 54 via electrical connector 72 to a processor 74.

A secondary fuel and air mixing duct 78 is arranged to supply a mixture of fuel and air into the secondary combustion zone 42 through an aperture 76 in the cylindrical wall 48 of the combustion chamber 22. The secondary fuel and air mixing duct 78 is arranged tangentially with the axis of the cylindrical wall 46 of the combustion chamber 22. The secondary fuel and air mixing duct 78 is arranged to direct the fuel and air mixture in a tangential direction and also with a downstream component to minimise interference with the primary combustion zone 40. The secondary fuel and air mixing duct 78 comprises a third, radially inner, axial flow swirler 80, an annular member 82 surrounding and extending downstream from the third axial flow swirler 80 and a fourth, radially outer, axial flow swirler 84 surrounding the annular member 82. The axial flow swirlers 80, 84 are arranged to provide substantially equal swirl or low residual swirl. A secondary fuel injector nozzle 86 is arranged coaxially within the third axial flow swirler 80, to supply fuel into the secondary fuel and air mixing duct 78. The secondary fuel injector 86 is a simplex fuel injector and is arranged to spray fuel onto the annular member 82, and the fuel is atomised and mixed with the air by the oppositely swirling flows of air from the axial flow swirlers 80 and 84. The low residual swirl prevents flow recirculation and hence combustion takes place in the secondary combustion zone 42 remote from the wall 48 of the combustion chamber 22 and this ensures low emissions of carbon monoxide (CO). If there was a residual swirl and hence a flow recirculation film cooling air would be entrained causing high carbon monoxide emissions.

A second air duct 88 supplies heated air from the heat exchanger 20 to the secondary fuel and air mixing duct 78. The second air duct 88 comprises a second valve 90 which is adjustable to vary the amount of air supplied to the secondary fuel and air mixing duct 78. The second valve 90 is adjusted by an actuator 92. The second valve 90 is a two position butterfly valve, but it may be any other suitable two position valve or a multi position valve. The second air duct 88 also comprises an air flow measuring device 92, for example a low loss Corioli meter, a venture meter or other low pressure loss velocity measuring device to accurately measure the air flow to the secondary fuel and air mixing duct 78. The flow measuring device 92 sends a signal corresponding to the amount of air flowing to the secondary fuel and air mixing duct 78 via electrical connector 94 to the processor 74.

A tertiary fuel and air mixing duct 98 is arranged to supply a mixture of fuel and air into the tertiary combustion zone 44 through an aperture 96 in the cylindrical wall 48 of the combustion chamber 22. The tertiary fuel and air mixing duct 98 is arranged tangentially with the axis of the cylindrical wall 46 of the combustion chamber 22. The tertiary fuel and air mixing duct 98 is arranged to direct the fuel and air mixture in the opposite tangential direction to the secondary fuel and air mixing duct 78 and also with a downstream component to minimise interference with the secondary combustion zone 42. The tertiary fuel and air mixing duct 98 comprises a fifth, radially inner, axial flow swirler 100, an annular member 102 surrounding and extending downstream from the fifth axial flow swirler 100 and a sixth, radially outer, axial flow swirler 104 surrounding the annular member 102. The axial flow swirlers 100, 104 are arranged to provide substantially equal swirl or low residual swirl. A tertiary fuel injector nozzle 106 is arranged coaxially within the fifth axial flow swirler 100, to supply fuel into the tertiary fuel and air mixing duct 98. The tertiary fuel injector 106 is a simplex fuel injector and is arranged to spray fuel onto the annular member 102, and the fuel is atomised and mixed with the air by the oppositely swirling flows of air from the axial flow swirlers 100 and 104.

A third air duct 108 supplies heated air from the heat exchanger 20 to the tertiary fuel and air mixing duct 98. The third air duct 108 does not comprise a valve. The third air duct 108 comprises an air flow measuring device 110, for example a low loss Corioli meter, a venturi meter or other low pressure loss velocity measuring device to accurately measure the air flow to the tertiary fuel and air mixing duct 108. The flow measuring device 110 sends a signal corresponding to the amount of air flowing to the secondary fuel and air mixing duct 108 via electrical connector 112 to the processor 74.

The combustion chamber 22 also comprises an outer cylindrical wall 114 spaced radially from the inner cylindrical wall 48 to define an annular passage 116 and the upstream end of the cylindrical wall 114 has a conical head 118 to close the annular passage 116 at its upstream end. The annular passage 116 is arranged to supply cooling air and dilution air around the inner cylindrical wall 48. The cylindrical wall 48 is cooled by the flow of air through the annular passage 116 and the dilution air flows through apertures 120 in the inner cylindrical wall 48 into the dilution section 46.

A fourth air duct 122 supplies heated air from the heat exchanger 20 to the annular passage 116. The fourth air duct 122 does not comprise a valve. The fourth air duct 122 comprises an air flow measuring device 124, for example a low loss Corioli meter, a venturi meter or other low pressure loss velocity measuring device to accurately measure the air flow to the annular passage 116. The flow measuring device 124 sends a signal corresponding to the amount of air flowing to the annular passage 116 via electrical connector 126 to the processor 74.

The processor 74 analyses the signals from the air flow measuring devices 70, 92, 110 and 124 to determine the amount of air flowing to the primary fuel and air mixing duct 54, the secondary fuel and air mixing duct 78, the tertiary fuel and air mixing duct 98 and the annular passage 116 respectively. The processor 74 determines and precisely controls the amount of fuel supplied to the primary fuel and air mixing duct 54, the secondary fuel and air mixing duct 78, the tertiary fuel and air mixing duct 98 to ensure the emissions of NOx, carbon monoxide, and unburned hydrocarbons from the combustion chamber 22 are minimised through the full power range of the gas turbine engine 10, particularly at low powers. The processor 74 sends signals to fuel valves 128, 130 and 132, via electrical connectors 134, 136 and 138 respectively, which control the supply of fuel to the primary fuel injector 62, the secondary fuel injector 86 and the tertiary fuel injector 106 respectively.

The secondary combustion zone 42 and tertiary combustion zone 44 are arranged such that they are not self stabilising, rather they are arranged such that the combustion is stabilised by the mixing of the hot gases from the upstream combustion stage.

In operation during starting and at low power up to about 3% power, the first valve 66 and the second valve 90 are closed to limit the air flow to the primary mixing duct 54 and the secondary mixing duct 78 to about 50% of the maximum flow through the primary mixing duct 54 and the secondary mixing duct 78. At power levels between about 3% power and about 6% power the first valve 66 is opened and at power levels above about 6% power the second valve 90 is opened. At power levels up to about 30% power the primary fuel injector 62 and the secondary fuel injector 86 only are supplied with fuel and at power levels above about 30% power the primary fuel injector 62, the secondary fuel injector 86 and the tertiary fuel injector 106 are supplied with fuel.

In one particular arrangement about 5% of the total air flow is supplied to the primary fuel and air mixing duct 54 when the first valve 66 is closed and about 10% of the total air flow is supplied to the primary fuel and air mixing duct 54 when the first valve 66 is open. In this arrangement about 5% of the total air flow is supplied to the secondary fuel and air mixing duct 78 when the second valve 90 is closed and about 10% of the total air flow is supplied to the secondary fuel and air mixing duct 78 when the second valve 90 is open. In this arrangement about 10% of the total air flow is supplied to the tertiary fuel and air mixing duct 98 at all times. In this arrangement about 80% of the total air flow is supplied to the air passage 116 when first and second valves 66 and 90 are closed and about 70% of the total air flow is supplied to the air passage 116 when first and second valves 66 and 90 are open. Approximately 40% of the total air flow is dilution air and is supplied through the dilution apertures 120 into the combustion chamber.

The first and second valves 66 and 90 respectively may be multi-position valves, this may allow the air flow to be redistributed to control, or minimise, noise by varying the air flow, combustion chamber residence time, the point of fuel injection and point of heat release.

The engine provides a part load SFC curve which is comparable with a diesel engine, particularly in the idle to 25% power range. This is achieved by maintaining the cycle parameters (i.e. pressures and temperatures) substantially constant over a large portion of the power range by use of variable vanes. A further effect is to reduce the engine rotational speed variation required for a given power range, which reduces the acceleration time requirement because the angles of the variable vanes are adjustable at a faster rate than the rotational speed of the engine can change.

The gas turbine engine 150 arrangement shown in FIGS. 7 to 10 comprises a first centrifugal air compressor 152 comprising a radial inlet duct 154 incorporating variable inlet guide vanes 156 and a centrifugal impeller (not shown). The centrifugal compressor 152 delivers air via a variable area radial diffuser 158 to a heat exchanger 160. The variable area radial diffuser 158 reduces the velocity of the air before it enters the heat exchanger 160.

The variable area inlet guide vanes 156 comprise an aerofoil cross section. These inlet guide vanes are fully open when full power is required thus allowing the air to reach the impeller without substantial swirl and even a small amount of anti-rotative swirl to ensure the maximum amount of flow is passed. When the power demand is reduced the variable area inlet guide vanes 156 are positioned in a semi-closed state. This causes rotative swirl of the working fluid reaching the impeller inlet, which reduces the relative velocity, because the rotative swirl velocity is effectively subtracted from the rotational speed vector. Thus the mass flow of the working fluid at any given speed is reduced. The centrifugal impeller produces an increase in static pressure and absolute velocity. The working fluid leaves the impeller at speeds up to approximately Mach 1.

The working fluid passes into a variable area radial diffuser 158 which contributes to the compressor pressure rise by recovering velocity as static pressure. The diffuser vanes are pivoted so as to move in a tangential direction with respect to the diffuser and adjust the throat area. As these vanes are closed simultaneously with the variable inlet guide vanes, the leading edge incidence is optimised. In addition the degree of diffusion up to the throat is controlled. Too high an incidence or attempted diffusion would also result in surge. Surge is where the adverse flow conditions cause a high local pressure loss resulting in flow reversal as the pressure rise cannot be sustained.

This working fluid is then passed through the heat exchanger 160, then into the combustion chamber 22 and then to a turbine 164. Fuel is burned in the combustion chamber 22 and the resulting combustion products flow into the turbine 164 which is drivingly connected to the centrifugal compressor 152.

The turbine 164 incorporates a variable area nozzle 166 which is operated so as to close the vanes as power demand falls thus reducing flow capacity. The turbine design expansion ratio is chosen high enough to ensure choked operation over most of the power range, thus ensuring flow capacity remains proportional to nozzle throat area. If unchoked, the flow capacity would be set by the expansion ratio and rotor throat area, sufficient variation could not be achieved via the nozzle area.

The turbine 164 is also connected to an output shaft 168 which drives an electrical generator 170. The electrical generator 170 is arranged to supply electricity to one or more electrical motors 174 via electrical connections 172, for example, for driving the wheels 178 of a motor vehicle or a propeller of a marine vessel. The hot exhaust gases from the turbine 164 are directed back into the heat exchanger 160 to directly pre-heat the air from the diffuser 158 before it enters the combustion chamber 22.

An inlet filter 153 is provided at the inlet to the radial inlet duct 154 to remove dust and debris from the air entering the gas turbine engine 150. One or more ducts 149 are provided to carry the air from the radial flow diffuser 158 to the heat exchanger 160. One or more ducts 151 are provided to carry the preheated air from the heat exchanger 160 to the combustion chamber 22. One or more exhaust ducts 180 carry the hot exhaust gases from the heat exchanger 160 to atmosphere.

An actuator 155 comprising a hydraulically, pneumatically or electrically driven piston, or ram, 157 is provided to vary the position of the variable area inlet guide vanes 156. An actuator 159 comprising a hydraulically, pneumatically or electrically driven piston, or ram, 161 is provided to vary the position of the vanes of the variable area radial diffuser 158. An actuator 165 comprising a hydraulically, pneumatically or electrically driven piston, or ram, 167 is provided to vary the position of the vanes of the variable area nozzle 166. The turbine 164 is shown as a two stage turbine in which case there is a second variable area nozzle 168 and the actuator 165 also actuates the variable area nozzle 168, but another separate actuator may be provided. Alternatively a single stage turbine may be provided.

The shaft 168 is mounted in one or more magnetic bearings 182, preferably the bearings are active magnetic bearings and the bearings are more preferably superconducting magnetic bearings, however other suitable bearings may be used. The magnetic bearings 182 are positioned upstream of the centrifugal compressor 152, remote from the gas turbine engine 150, so that they are cool and are not affected by heat from the gas turbine engine 150.

The heat exchanger 160 preferably comprises a heat exchanger as described in our published European patent application no. 0753712A2, which is hereby incorporated by reference. The duct 149 supplies the air to the radially outer ends of a first set of radial passages through the heat exchanger 160 so that the air flows axially through an axially extending passage to a second set of radial passages through the heat exchanger 160 and then to the duct 151.

The combustion chamber 22 is the same as that described previously with reference to FIG. 5.

The engine provides a part load SFC curve which is comparable with a diesel engine, particularly in the idle to 25% power range. This is achieved by maintaining the cycle parameters (i.e. pressures and temperatures) substantially constant over a whole power range by use of variable vanes. A further effect is to reduce the engine rotational speed variation required for a given power range, which reduces the acceleration time requirement because the angles of the variable vanes are adjustable at a faster rate than the rotational speed of the engine can change.

The objective of the variable vanes at the inlet to the centrifugal compressor, diffuser, first turbine and power turbine is to allow reduced mass flow whilst maintaining pressure ratio and efficiency. The variable vanes are adjusted to reduce the mass flow for the compressor, diffuser and all the turbines as the power demand falls, or conversely the variable vanes are adjusted to increase mass flow for the compressor, diffuser and all the turbines over a predetermined wide power range. The values of the cycle temperature, speed and pressure ratio are maintained substantially constant over the predetermined wide power range and therefore the specific fuel consumption is maintained substantially constant over this predetermined wide power range.

The variable area inlet guide vanes for the centrifugal compressor enhance the centrifugal compressor's ability to deliver reduced mass flow at constant engine rotational speed.

It is expected that the emission levels of the combustion chamber assembly will be less than 0.5 gm per kw hr.

Figure 11:
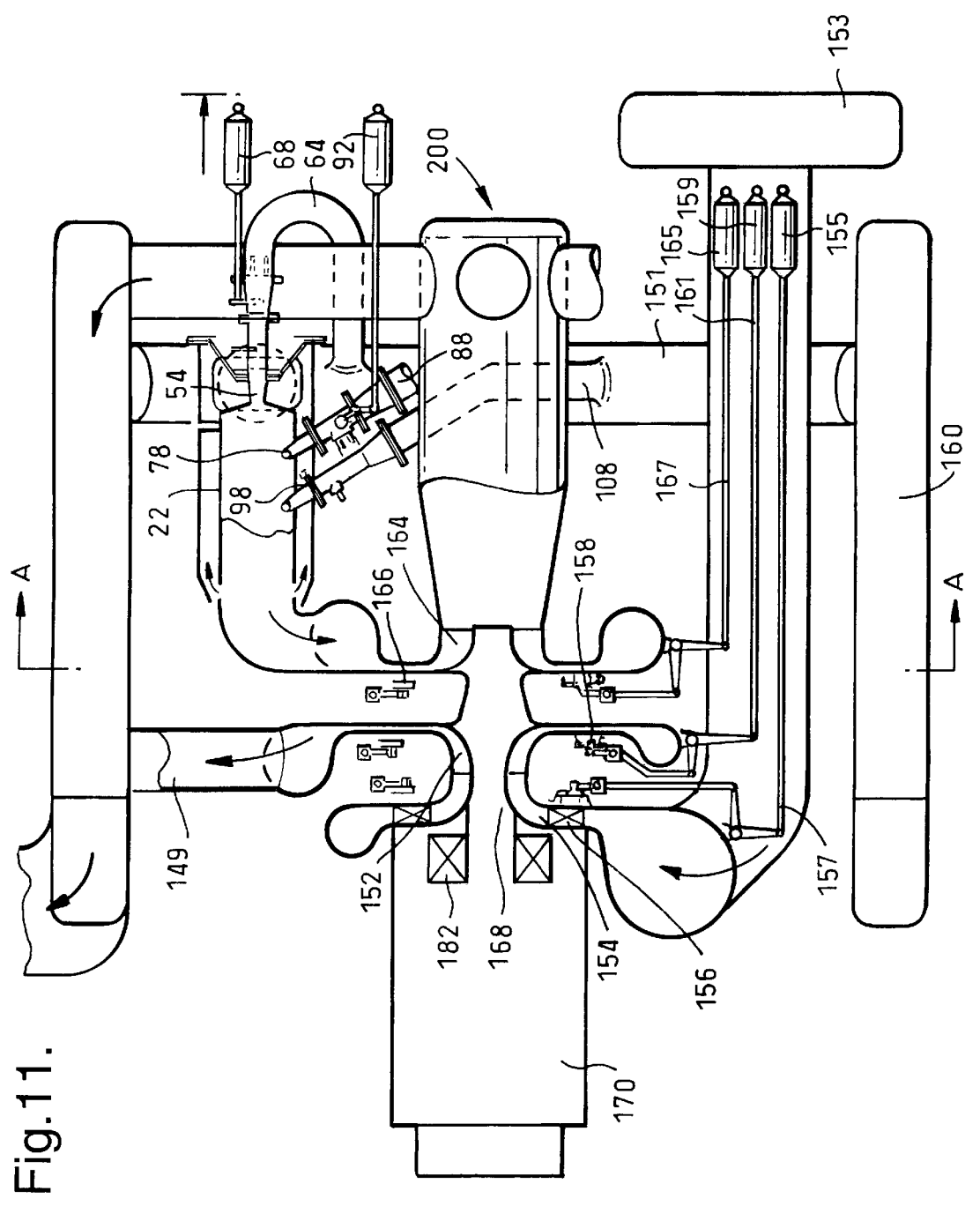

A further gas turbine engine 200 arrangement is shown in FIG. 11, but this is similar to that shown in FIGS. 7 to 10 and like numerals denote like components. The gas turbine engine 200 differs from that in FIGS. 7 to 10 in that the axis of the combustion chamber 22 is arranged substantially parallel to that of the gas turbine engine 200, a single stage radial flow turbine 164 is used and the heat exchanger 160 is arranged with an internal radius larger than the maximum radius of any component extending from the gas turbine engine such that the heat exchanger is positioned substantially coaxially around the gas turbine engine 200. The advantage of this arrangement is that the heat exchanger 200 acts as a containment structure for the gas turbine engine 200 should one of the turbine blades, compressor blades, turbine rotor, compressor rotor etc. become fractured and released from the gas turbine engine and penetrate the casing of the gas turbine engine 200. This is important in the case of use in motor vehicles, trains, microturbine power units in houses, hotels and other buildings etc.

Figure 1:
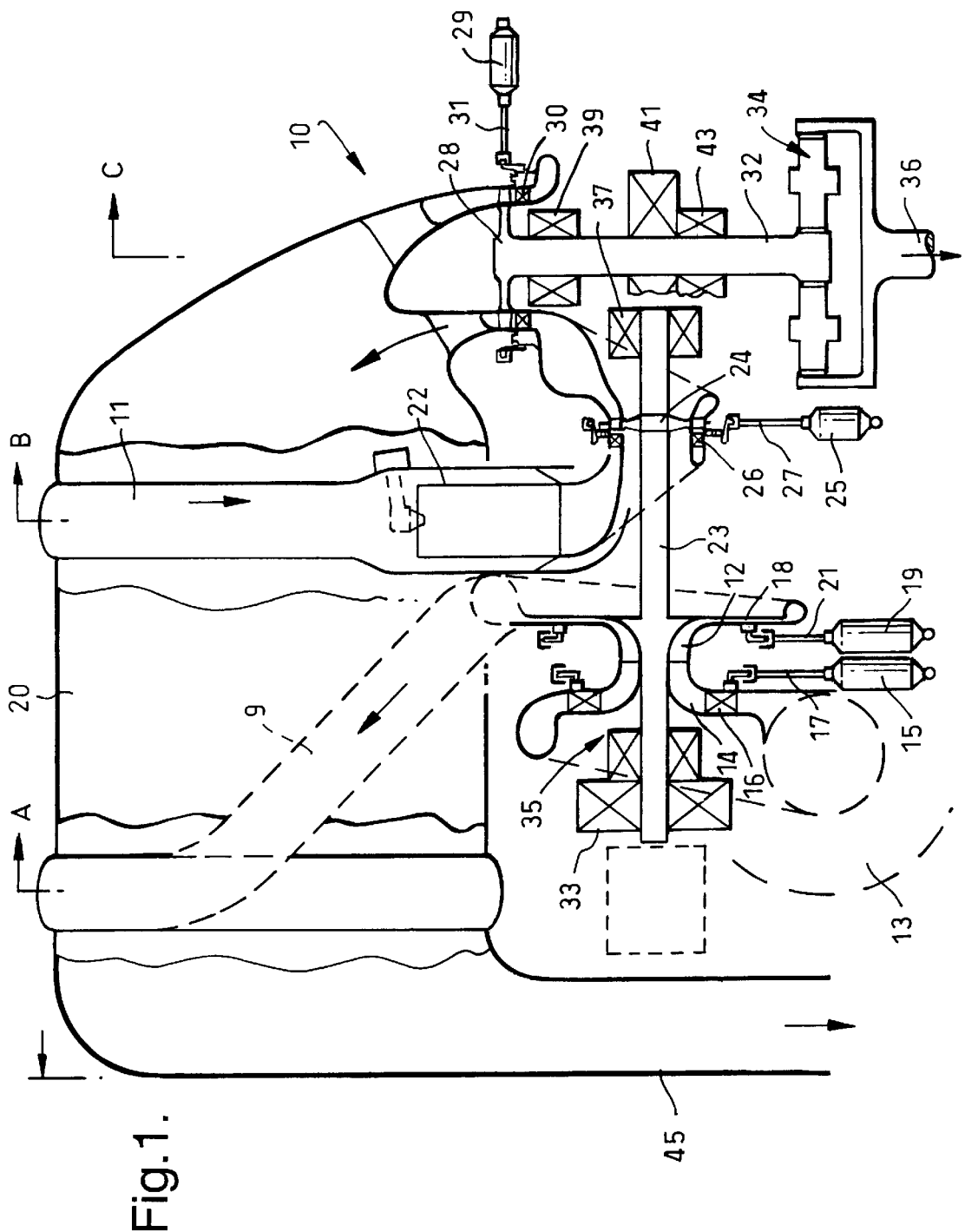
FIG. 1 shows a gas turbine engine according to the present invention.
Figure 2:
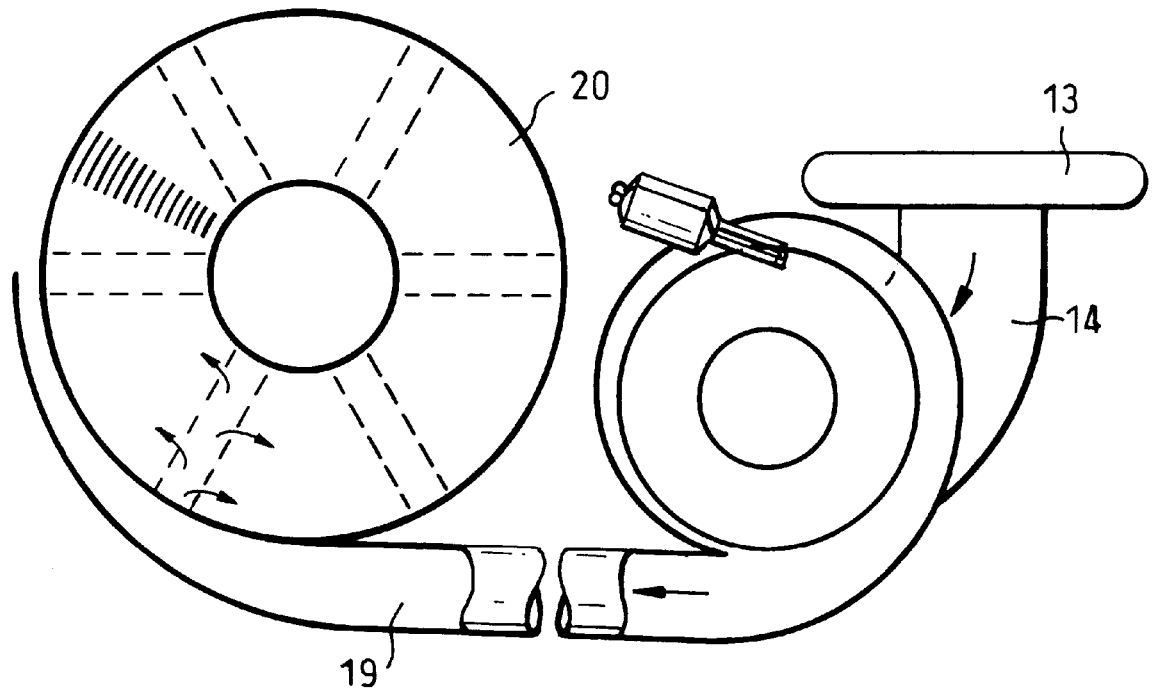
FIG. 2 is an enlarged cross-sectional view in the direction of arrows A—A in FIG. 1.
Figure 12:
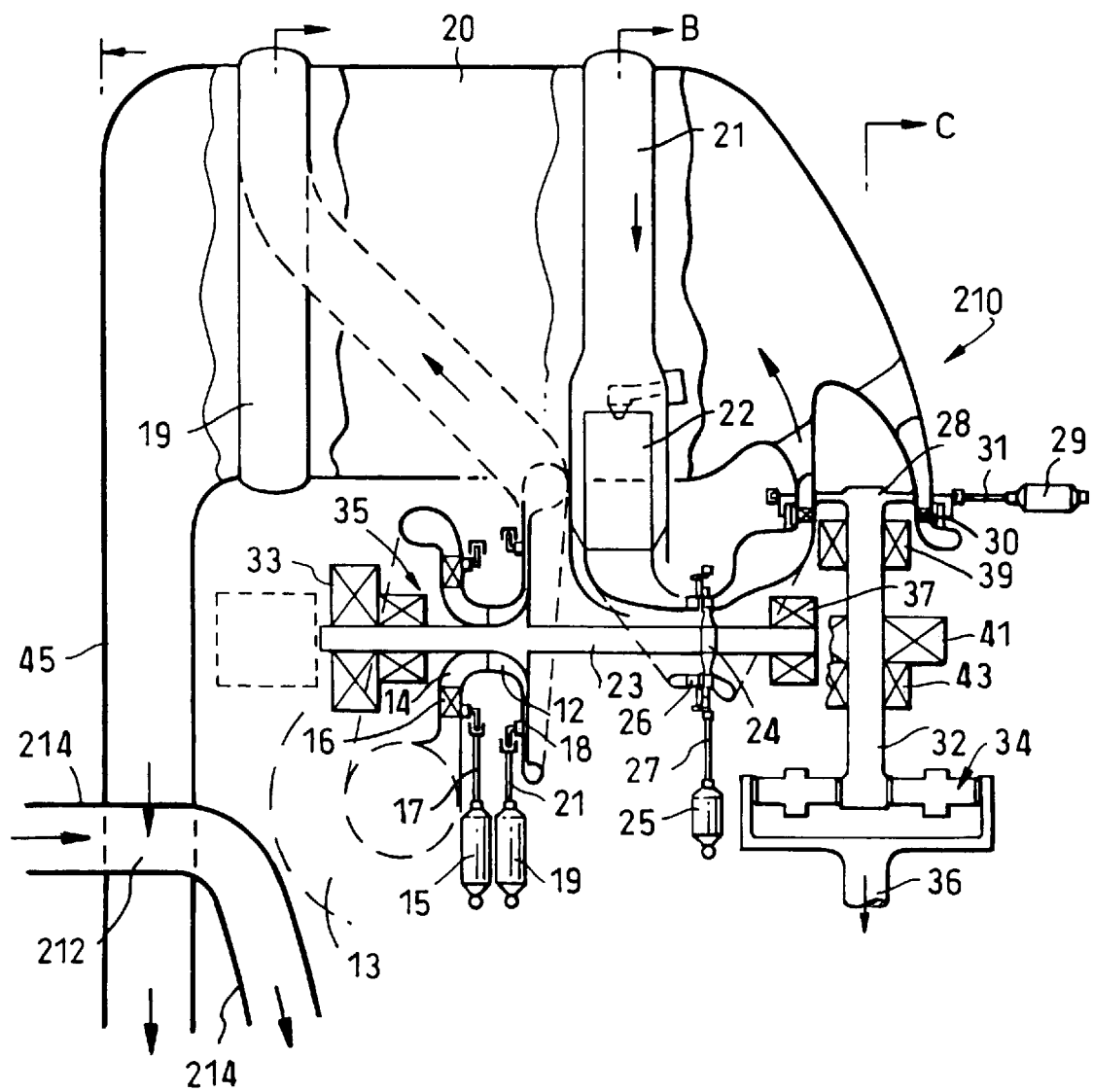
FIG. 12 shows a modification to the gas turbine engine shown in FIG. 1.

The gas turbine engine 210 arrangement shown in FIG. 12 is substantially the same as that shown in FIG. 1, but differs in that the exhaust duct 45 is provided with an additional heat exchanger 212 which is used to heat fluid passing through duct 214. The duct 214 may carry air from atmosphere to an air conditioner in a motor vehicle, train, building to preheat the air and to further cool the exhaust gases, preferably to 40° C. or less. The air conditioner may comprise an absorption chiller. Alternatively the duct 214 may carry fuel to the combustion chamber 22 to preheat the fuel and to further cool the exhaust gases, preferably to 40° C. or less. Alternatively the duct 214 may carry water, which is boiled in the heat exchanger, to further cool the exhaust gases, preferably to 40° C. or less. Preferably the flow of fluid through the duct 214 is permanent during operation of the gas turbine engine 210.

Figure 13:
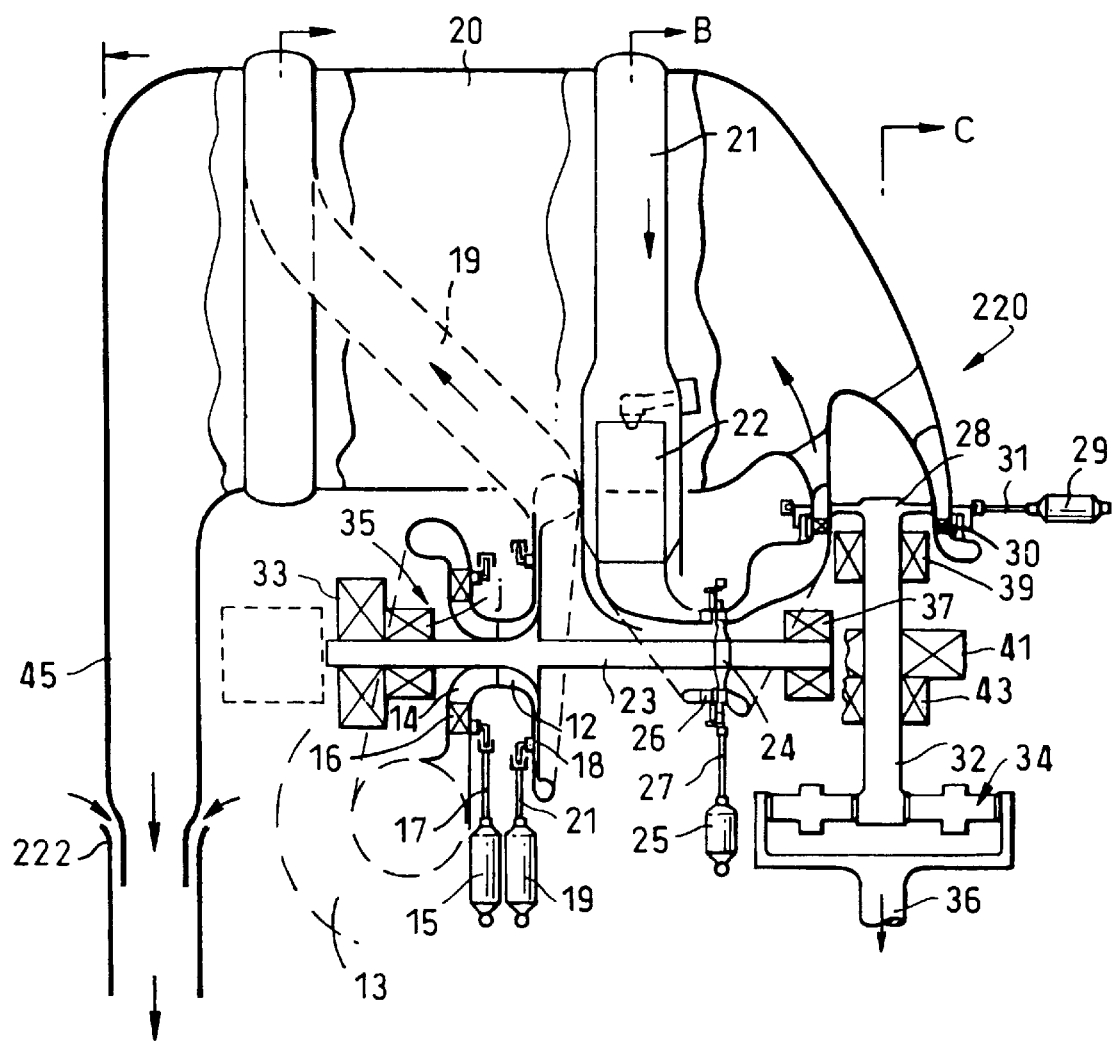
FIG. 13 shows a modification to the gas turbine engine shown in FIG. 1.

The gas turbine engine 220 arrangement shown in FIG. 13 is substantially the same as that shown in FIG. 1, but differs in that the exhaust duct 45 is provided with an ejector 222 such that air is drawn from the atmosphere into the exhaust duct 45 to mix with the exhaust gases to further cool the exhaust gases, preferably to 40° C. or less.

Figure 14:
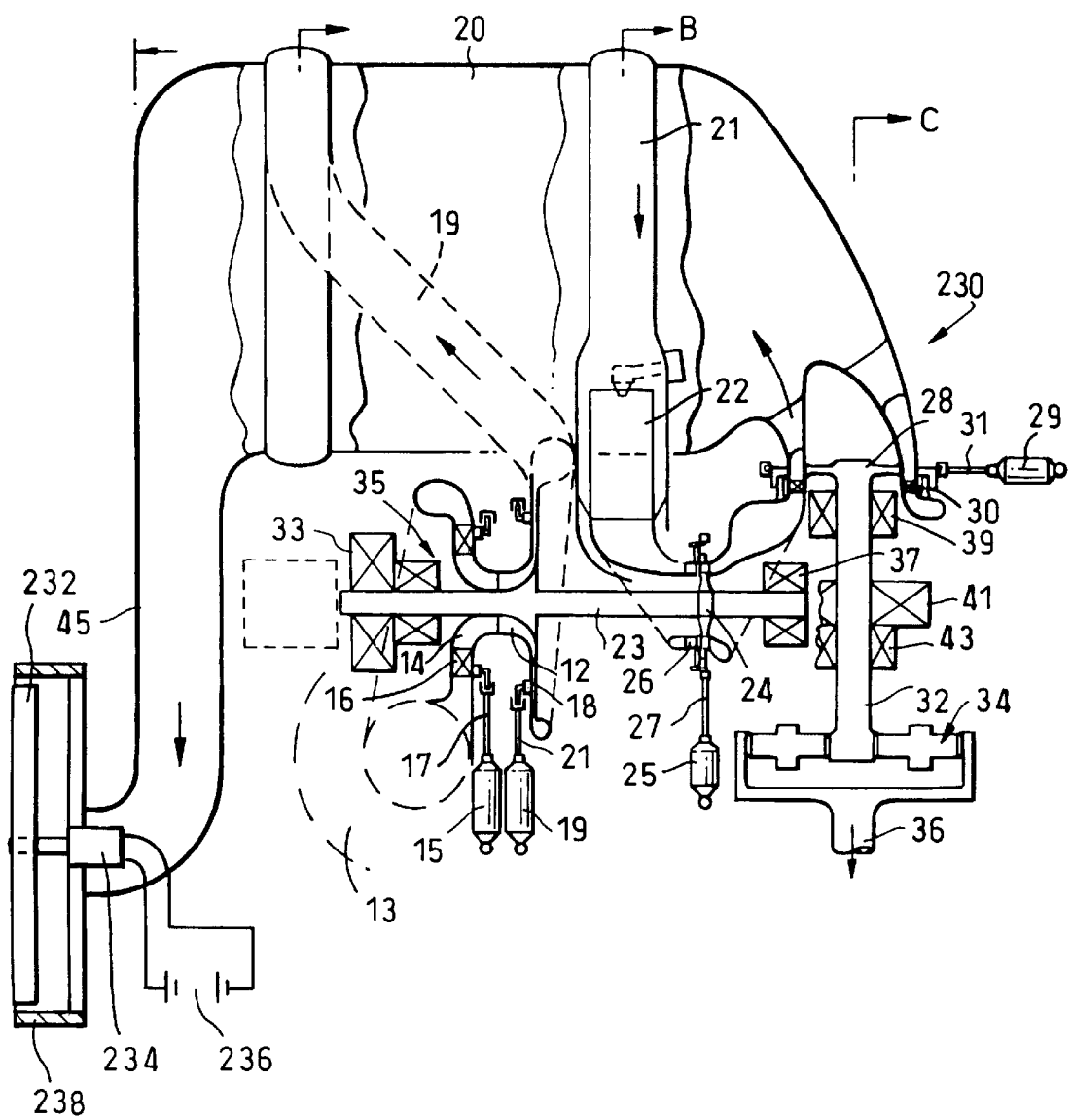
FIG. 14 shows a modification to the gas turbine engine shown in FIG. 1.

The gas turbine engine 230 arrangement shown in FIG. 14 is substantially the same as that shown in FIG. 1, but differs in that the exhaust duct 45 is provided with a fan 232 at its downstream end. The fan 232 is rotatably mounted and is driven by an electric motor 234 provided with electrical energy from a power supply 236. The fan 232 is preferably surrounded by a coaxial casing 238. Also mounted from the exhaust duct 45 or other structure. The fan 232 mixes air drawn from the atmosphere with the exhaust duct 45 to further cool the exhaust gases, preferably to 40° C. or less.

Figure 15:
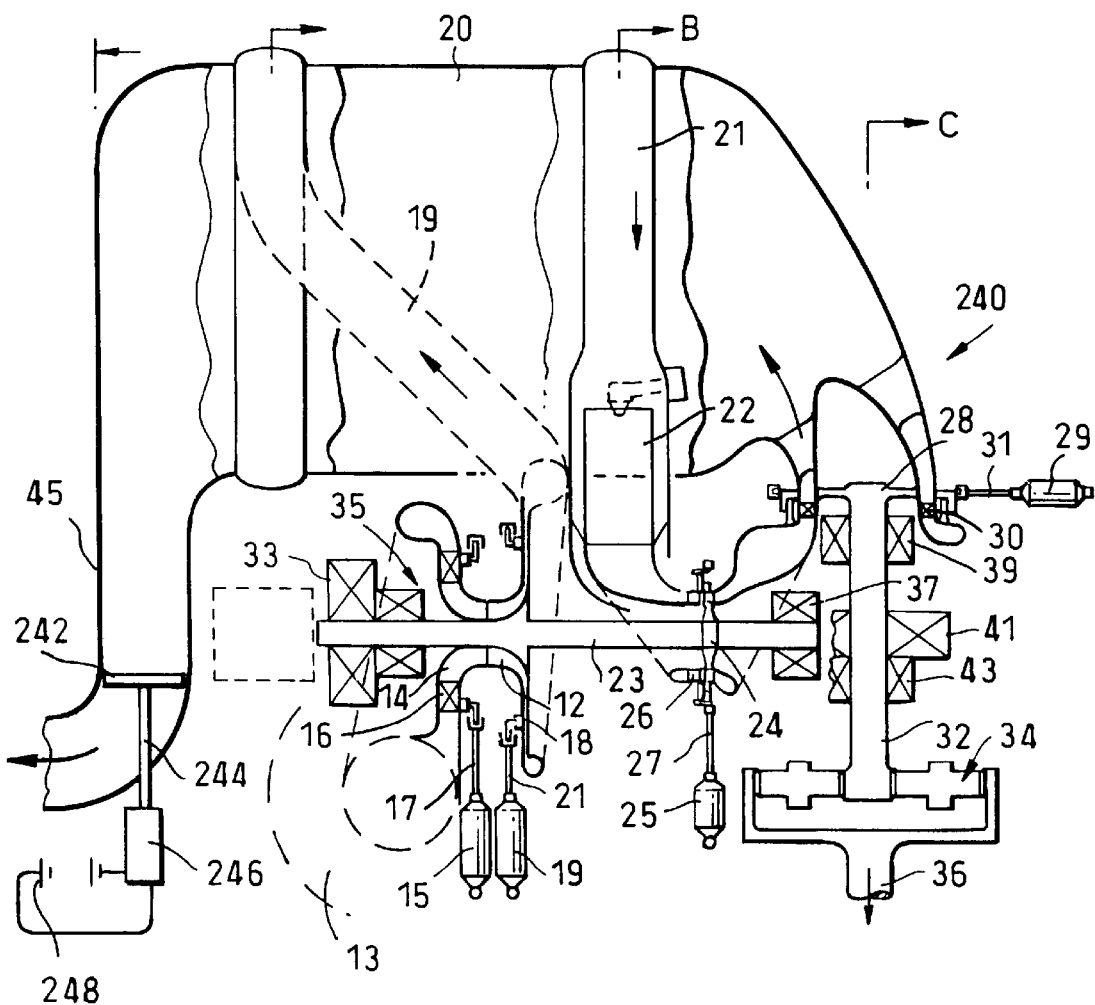
FIG. 15 shows a modification to the gas turbine engine shown in FIG. 1.

The gas turbine engine 240 arrangement shown in FIG. 15 is substantially the same as that shown in FIG. 1, but differs in that the exhaust duct 45 is provided with an additional turbine 242 at its downstream end. The turbine 242 is rotatably mounted in the exhaust duct 45 and is arranged to drive an electric motor 246 via a shaft 244. The electric motor 246 is arranged to provide electrical energy to charge a battery power supply 248 or supply an electrical load. The turbine 242 further cools the exhaust gases, preferably to 40° C. or less.

It may also be possible to provide a combination of two or more of the additional features in FIGS. 12 to 15, for example the ejector of FIG. 13 and the fan of FIG. 14.

The arrangements in FIGS. 12 to 15 are intended to reduce the exhaust temperature of the exhaust gases from the gas turbine engine such that they are not a hazard to people, animals or structures in the immediate vicinity of the exhaust duct. In the case of a motor vehicle or train it is preferred that the exhaust duct is at the rear of the motor vehicle or train.

Although the invention has been described with reference to a gas turbine engine comprising a single combustion chamber assembly comprising a single primary fuel and air mixing duct, a single secondary fuel and air mixing duct and a single tertiary fuel and air mixing duct for the primary, secondary and tertiary combustion stages other combustion chamber assemblies are possible. It may be desirable, if increased power is required from the gas turbine engine, to provide a plurality of combustion chamber assemblies each one of which comprising a single primary fuel and air mixing duct, a single secondary fuel and air mixing duct and a single tertiary fuel and air mixing duct for the respective primary, secondary and tertiary combustion stages. Alternatively it may be desirable, if increased power is required from the gas turbine engine, to provide a single combustion chamber assembly comprising a plurality of primary fuel and air mixing ducts, a plurality of secondary fuel and air mixing ducts and a plurality of tertiary fuel and air mixing ducts for the primary, secondary and tertiary combustion stages. Alternatively it may be possible to provide one or more combustion chambers, each combustion chamber comprising any number of combustion stages, at least one of which has a mixing duct with means to vary the air flow into the combustion stage. Thus the combustion chamber may comprise two combustion stages with means to vary the air flow into one or both of the combustion stages or four combustion stages with means to vary the air flow to one, two, three or all of the stages.

We claim:

1. A gas turbine engine comprising a centrifugal compressor, a diffuser, a heat exchanger, combustion apparatus and at least one turbine, wherein said centrifugal compressor, said diffuser, said combustion apparatus and said at least one turbine comprising means for varying the flow capacity at their inlets such that in operation the flow capacity of each component is independently variable so that over a predetermined power range the gas turbine engine mass flow is variable whilst maintaining the temperature, pressure ratio and speed of rotation of the gas turbine engine substantially constant.

2. A gas turbine engine according to claim 1 wherein the combustion apparatus comprises a primary combustion zone and a secondary combustion zone, the primary combustion zone being provided with a primary fuel and air mixing duct, the secondary combustion zone being provided with a secondary fuel and air mixing duct, said primary fuel and air mixing duct and said secondary fuel and air mixing duct comprising means for varying the flow capacity at their inlets.

3. A gas turbine engine according to claim 1 wherein the combustion apparatus comprises a primary combustion zone, a secondary combustion zone and a tertiary combustion zone, the primary combustion zone being provided with a primary fuel and air mixing duct, the secondary combustion zone being provided with a secondary fuel and air mixing duct, the tertiary combustion zone being provided with a tertiary fuel and air mixing duct, said primary fuel and air mixing duct and said secondary fuel and air mixing duct comprising means for varying the flow capacity at their inlets.

4. A gas turbine engine according to claim 1 comprising a first turbine drivingly connected to the centrifugal compressor and a second turbine drivingly connected to a load.

5. A gas turbine engine according to claim 4 wherein the second turbine is connected to the load via a gear unit.

6. A gas turbine engine according to claim 1 comprising a first turbine drivingly connected to the centrifugal compressor and drivingly connected to an electrical generator.

7. A gas turbine engine according to claim 6 wherein the electrical generator is electrically connected to at least one electrical motor or an electric grid.

8. A gas turbine engine according to claim 7 wherein the electrical motor is drivingly connected to a load.

9. A gas turbine engine as claimed in claim 4 wherein the load comprises a propeller of a marine vessel or a driving wheel of an automotive vehicle.

10. A gas turbine engine according to claim 1 wherein the means for varying the flow capacity of the compressor comprises variable inlet guide vanes.

11. A gas turbine engine according to claim 1 wherein the means for varying the flow capacity of the diffuser comprises moveable diffuser vanes pivotable such that their leading edges move in a tangential direction with respect to the axis of the diffuser.

12. A gas turbine engine according to claim 11 wherein the variable diffuser vanes are adapted to be moveable in unison with the variable inlet guide vanes.

13. A gas turbine engine according to claim 1 wherein the means for varying the flow capacity of the at least one turbine comprises variable area nozzles positioned within the inlet to the at least one turbine.

14. A gas turbine engine according to claim 12 wherein the at least one turbine is arranged to have a choked operation over the predetermined power range to ensure the flow capacity remains proportional to the area of the variable area nozzles.

15. A gas turbine engine according to claim 1 wherein the heat exchanger is annular.

16. A gas turbine engine according to claim 15 wherein the gas turbine engine is arranged substantially within the annular heat exchanger such that the heat exchanger forms a containment structure around the gas turbine engine.

17. A gas turbine engine according to claim 1 wherein an exhaust duct carries hot exhaust gases discharged from the at least one turbine from the heat exchanger.

18. A gas turbine engine according to claim 17 wherein a second heat exchanger is arranged in the exhaust duct, the second heat exchanger is arranged to heat another fluid to cool the exhaust gases.

19. A gas turbine engine according to claim 18 wherein the second heat exchanger is arranged to heat air flowing through a duct to an air conditioning system.

20. A gas turbine engine according to claim 18 wherein the second heat exchanger is arranged to heat water flowing through a duct, or in a boiler.

21. A gas turbine engine according to claim 18 wherein the second heat exchanger is arranged to heat fuel flowing through a duct to the combustion chamber of the gas turbine engine.

22. A gas turbine engine according to claim 17 wherein a further turbine is arranged in the exhaust duct to cool the exhaust gases, the further turbine is arranged to drive a generator to charge a battery or supply an electrical load.

23. A gas turbine engine according to claim 17 wherein an ejector is arranged in the exhaust duct to entrain air into the exhaust duct to cool the exhaust gases.

24. A gas turbine engine according to claim 17 wherein a fan is arranged at the downstream end of the exhaust duct to mix air with the exhaust gases to cool the exhaust gases.

25. A gas turbine engine according to claim 24 wherein the fan is driven by an electric motor.

26. A gas turbine engine according to claim 4 wherein the centrifugal compressor and first turbine are rotatably mounted by magnetic bearings, the magnetic bearings being arranged remote from the first turbine and combustion chamber.

27. A gas turbine engine according to claim 4 wherein the second turbine is rotatably mounted by magnetic bearings remote from the first turbine, second turbine and combustion chamber.

28. A method of controlling a gas turbine engine wherein the engine includes a centrifugal compressor, diffuser means, a heat exchanger, combustion apparatus and at least one turbine, comprising the steps of independently varying the flow capacity of the centrifugal compressor, the diffuser, the combustion apparatus and the at least on turbine such that the mass flow through each component is proportional to the power requirements of the gas turbine engine.

29. A method as claimed in claim 28 wherein the combustion apparatus comprises a primary combustion stage, a secondary combustion stage and a tertiary combustion stage, the primary combustion stage being provided with a primary fuel and air mixing duct, the secondary combustion stage being provided with a secondary fuel and air mixing duct, the tertiary combustion stage being provided with a tertiary fuel and air mixing duct, the method comprising independently varying the flow capacity of the centrifugal compressor, the diffuser, the primary fuel and air mixing duct, the secondary fuel and air mixing duct and the at least one turbine such that the mass flow through each component is proportional to the power requirements of the gas turbine engine.

30. A method of controlling a gas turbine engine wherein the engine includes a centrifugal compressor, a diffuser, a heat exchanger, combustion apparatus and at least one turbine, said compressor, said diffuser, said combustion apparatus and said at least one turbine all comprise means for varying the flow capacity at their inlets, comprising the steps of independently varying the flow capacity of each component so that over a predetermined power range the gas turbine engine mass flow is variable whilst maintaining the temperature, pressure ratio and speed of rotation of the gas turbine engine substantially constant.

31. A method as claimed in claim 30 wherein the combustion apparatus comprises a primary combustion stage, a secondary combustion stage and a tertiary combustion stage, the primary combustion stage being provided with a primary fuel and air mixing duct, the secondary combustion stage being provided with a secondary fuel and air mixing duct, the tertiary combustion stage being provided with a tertiary fuel and air mixing duct, said centrifugal compressor, said diffuser, said primary fuel and air mixing duct, said secondary fuel and air mixing duct and said at least one turbine all comprise means for varying the flow capacity at their inlets, comprising the steps of independently varying the flow capacity of each component so that over a predetermined power range the gas turbine engine mass flow is variable whilst maintaining the temperature, pressure ratio and speed of rotation of the gas turbine engine substantially constant.

* * * * *